US012616862B2

(12) United States Patent
Agafonov et al.

(10) Patent No.: US 12,616,862 B2
(45) Date of Patent: May 5, 2026

(54) FIREFIGHTING COMPOSITIONS

(71) Applicant: BIOMA LTD, Rishon Lezion (IL)

(72) Inventors: Andrey Valerievich Agafonov, Novosibirsk (RU); Boris Melnik, Netivot (IL)

(73) Assignee: BIOMA LTD, Rishon Lezion (IL)

( * ) Notice: Subject to any disclaimer, the term of this patent is extended or adjusted under 35 U.S.C. 154(b) by 650 days.

(21) Appl. No.: 18/020,236

(22) PCT Filed: Aug. 8, 2021

(86) PCT No.: PCT/IL2021/050966

§ 371 (c)(1),
(2) Date: Feb. 7, 2023

(87) PCT Pub. No.: WO2022/034580

PCT Pub. Date: Feb. 17, 2022

(65) Prior Publication Data

US 2023/0285788 A1 Sep. 14, 2023

(30) Foreign Application Priority Data

Aug. 9, 2020 (IL) ........................................ 276579

(51) Int. Cl.
*A62D 1/00* (2006.01)
*A62D 1/06* (2006.01)

(52) U.S. Cl.
CPC ......... *A62D 1/0014* (2013.01); *A62D 1/0035* (2013.01); *A62D 1/06* (2013.01)

(58) Field of Classification Search
None
See application file for complete search history.

(56) References Cited

U.S. PATENT DOCUMENTS

| | | | |
|---|---|---|---|
| 4,168,239 A | 9/1979 | Mertz et al. | |
| 2009/0005471 A1* | 1/2009 | Bauer .................... | C09K 21/12 524/14 |
| 2013/0181158 A1 | 7/2013 | Guo et al. | |
| 2017/0056698 A1* | 3/2017 | Pai ....................... | A62D 1/0042 |

FOREIGN PATENT DOCUMENTS

| | | | |
|---|---|---|---|
| CN | 104436511 | A | 3/2015 |
| CN | 107029377 | A | 8/2017 |
| CN | 107551444 | A | 1/2018 |
| CN | 107715363 | A | 2/2018 |
| CN | 107837485 | A | 3/2018 |
| CN | 111135522 | A | 5/2020 |
| JP | 2001-37901 | A | 2/2001 |
| RU | 2 310 421 | C2 | 11/2007 |
| RU | 2 418 611 | C1 | 5/2011 |
| WO | WO 02/28484 | A1 | 4/2002 |
| WO | WO 2015/051917 | A1 | 4/2015 |

OTHER PUBLICATIONS

International Search Report for PCT/IL2021/050966 (PCT/ISA/210) mailed on Nov. 5, 2021.
Written Opinion of the International Searching Authority for PCT/IL2021/050966 (PCT/ISA/237) mailed on Nov. 5, 2021.
European Communication pursuant to Article 94(3) EPC for European Application No. 21 762 142.4, dated Aug. 21, 2025.

* cited by examiner

*Primary Examiner* — Joseph D Anthony
(74) *Attorney, Agent, or Firm* — Birch, Stewart, Kolasch & Birch, LLP

(57) ABSTRACT

The disclosure relates to firefighting measures, and in particular, to firefighting compositions for preventing, retarding and extinguishing fire in a combustion zone that comprises a combination of at least one cooling component, at least one fire-isolation component comprising, at least one oxidizer diluting component, and at least one flame retarding component.

14 Claims, No Drawings

FIREFIGHTING COMPOSITIONS

TECHNOLOGICAL FIELD

This disclosure relates to firefighting measures, and in particular, to firefighting compositions for preventing, retarding and extinguishing fire in a combustion zone.

BACKGROUND ART

References considered to be relevant as background to the presently disclosed subject matter are listed below:

US patent application publication no. US2013/181158
Chinese patent application publication no. CN111135522
Chinese patent application publication no. CN107029377
Chinese patent application publication no. CN104436511
Chinese patent application publication no. CN107551444
Chinese patent application publication no. CN107715363

Acknowledgement of the above references herein is not to be inferred as meaning that these are in any way relevant to the patentability of the presently disclosed subject matter.

BACKGROUND

Fire ignites as a result of physicochemical combustion processes that can occur in the presence of a flammable or combustible material, in combination with a sufficient quantity of an oxidizer, such as oxygen, gas or another oxygen-rich compound, and an ignition source. The ignition source can vary, for example natural (e.g., a thunderstorm, self-ignition, etc.), industrial (e.g., process accidents, explosions, etc.) or household-related (e.g., unintentional/accidental ignition). Once a material begins to burn, the fire may be extinguished with an appropriate mixture of flame retardants and fire extinguishing agents in liquid, solid, or gaseous form.

As behavior of fire depends, inter alia, on the fuel source, different extinguishing approaches and means typically need to be applied. According to US classification, fires can be classified into five different types, depending on the flammable material involved.

Class A fires are defined as ordinary combustibles, in which commonly flammable material are involved as fuel source. This is essentially the common accidental fire typically encountered. Wood, fabric, paper, trash, and plastics are common sources of Class A fires.

A Class B fire is fueled by flammable liquids or gases, such as petroleum-based oils and paints, kerosene, gasoline, butane, propane, etc. Class B fires are a common hazard in industries involving fuels, lubricants, and certain types of paint.

A Class C fire originates from and typically involves burning of electrical components and/or energized equipment. Electrical fires often involve ignition of motors, appliances, and electronic transformers, and are common to industries making use of heavy electrically-powered equipment. A Class D fire involves ignition of combustible metals, such as titanium, magnesium, aluminum, and potassium.

A Class K fire is defined as a cooking fire involving combustion from liquids used in food preparation. Cooking fires are fueled by a wide range of liquid cooking materials. Greases, cooking oils, vegetable fat, and animal fat are all fuel sources found in Class K fires.

Several main fundamental ways of extinguishing fires are known. One way for extinguishing a fire is cooling the burning material, and is the most common method used to extinguish a fire. During cooling, energy is transported from the combustion site to the molecules of the extinguishing agent. The energy absorbed typically increases the temperature of the extinguishing agent, causes change of its state (e.g. vaporization or sublimation), and/or breaks the chemical bonds between atoms of the extinguishing agent. Without wishing to be bound by theory, such energy absorption prevents or reduces the risk of reaching the activation energy of fuel-oxidant reaction, and can, at times, eliminate the formation of combustible vapors.

A fire can also be extinguished by eliminating the fuel source (i.e. starvation). An example is to cut off the supply of combustible liquid or gas, by closing a feed valve or by removing the fuel that has not been affected by the fire from the combustion zone. In forest fires, eliminating of the fuel can be achieved by using firewalls or firebreaks.

Another mechanism is separation between the fuel and the oxidizer. For example, fire can be suffocated by placing a physical barrier between the fuel or the vapors released by the fuel and the oxidizer. Likewise, a fire can be suffocated by excluding oxygen from the burning site. This can be achieved, for example, by utilizing smothering agents such as spray, foam or any other agents that can form a fire-resistant, oxygen barrier layer over the fire.

Reducing or even eliminating the amount or concentration of oxidizing agent in the combustion zone is also used to extinguish fires. This method provides an extinguishing action by diluting the concentration of oxidizing agent in the combustion zone.

Using flame retardants, which are materials that interfere chemically with the combustion process and thereby delay propagation of the flame, is a further way to fight a fire. In this case, the fire is extinguished by chemically deactivating the intermediate free radicals and/or by physical deactivation caused by placing molecules of the extinguishing agent in between the reactive species. Both effects produce discontinuation of the fuel-oxidizer chain reaction.

A commonly used fire extinguishing material is water, which is typically suitable for solid combustible fires of Class A, for example, wood, paper, fabrics, and coal. The fire-extinguishing effect of water is caused by cooling the burning material and its environment, dilution of the air in the vicinity of the burning material, and accumulation of water vapors in the air in the vicinity of the burning material during water evaporation. Applying water can also result in reducing the concentration of fuel in the combustion site (for example, the application of water to dilute polar liquid fuels, e.g., alcohols).

However, the use of water for fire extinguishing also has a number of disadvantages. Water has a high rate of evaporation from the surface of the burning material, and thus only a small portion of the total amount sprayed on the burning material is utilized to actually extinguish the fire. Further, water typically insufficiently penetrates into pores of porous burning materials, that can contain oxygen, thereby reducing the extinguishing effectiveness. Water is also not suitable to extinguish fires of Classes B, C and D, as the sources of fuel in such fires can violently react, physically or chemically, with water. In addition, when using water to extinguish fires, areas where a fire has been extinguished can be easily re-ignited.

Although water is a common fire extinguishing substance, various other fire extinguishing agents, such as halocarbons, halon, potassium chloride and carbon dioxide, are used to fight fires. However, these fire extinguishing agents are of limited effective lifetime, often toxic (or generate toxic byproducts), or are otherwise harmful to the environment.

Non-toxic alternatives are generally restricted in their uses, have a limited lifespan, or present other shortcomings.

GENERAL DESCRIPTION

Despite the variety of existing fire extinguishing agents, there is a need for low-cost fire extinguishing compositions that are capable not only to effectively prevent and liquidate burning of multiple classes of fire, but also to extinguish fires burning is a broad temperature range, while protecting humans and the environment from the dangerous factors of the fire.

Therefore, it would be useful to have a firefighting composition for preventing, retarding and/or extinguishing a broad range of fire types, which involves the combination of all known fire extinguishing effects: cooling, dilution, isolation and inhibition.

The compositions of the present disclosure are based on non-toxic components, which were surprisingly found to have a synergistic effect in extinguishing fire over a broad range of temperatures and fuel sources. More specifically, the fire extinguishing compositions of the present disclosure utilize at least four fire extinguishing effects, including cooling of the combustion zone, isolation of a burning material in the combustion zone to limit access of oxygen to the fire, dilution of oxidizers in the combustion zone, and inhibition of chemical reactions associated with burning processes which occur in the combustion zone. The firefighting composition enables a combined fire retarding and extinguishing action for firefighting in the combustion zone.

To this end, the fire extinguishing composition includes a plurality of fire extinguishing components. Each extinguishing component operates in a corresponding temperature range, and provides at least one fire extinguishing effect, such as cooling, dilution, isolation and retardation, thus providing a fire extinguishing functionality over a broad range of temperatures and fire conditions (which are dynamic and evolve during fire incidents).

Further, at least some components of the composition were found to provide a synergistic fire extinguishing effect when combined, resulting in significantly improved extinguishing performance, enabling utilization of significantly less amounts of composition to obtain complete extinguishing of fire, as well as reducing the time required to obtain complete fire extinguishing and prevent re-ignition.

Thus, according to one of its aspects, the disclosure provides a fire firefighting composition for preventing, retarding, and/or extinguishing a fire in a combustion zone, the composition comprises at least one cooling component, at least one fire-isolation component comprising at least one sulfate salt and at least one alum, at least one oxidizer diluting component, and at least one flame retarding component.

When the firefighting composition of this disclosure is used to prevent (or any lingual variation thereof) a fire, it is typically distributed or deployed over or around a potential fire site to keep fire from igniting or inflaming. Retarding (or any lingual variation thereof) of a fire means to denote arresting or slowing-down the rate by which fire develops and/or increasing the time required for a material to ignite once exposed to fire conditions. Extinguishing (or any lingual variation thereof) means to denote to cause ceasing of a fire once ignited.

The term component as utilized herein refers to a material (i.e. a single material) or a composition of matter comprising one or more molecules having the desired effect. It is noted that a component can have one or more firefighting effects in the composition.

In the context of the present disclosure, a cooling component means to denote one or more chemical compounds that reduce the temperature in the combustion zone, typically by absorbing energy from the combustion site by one or more endothermic chemical reactions, resulting in thermal decomposition once reaching the compound's decomposition temperature. The composition, by some embodiments, comprises a plurality (i.e. two or more) such cooling components, each having a different thermal decomposition temperature, thereby providing a cooling effect over a broad range of temperatures.

By some embodiments, the cooling component can be selected from sodium bicarbonate ($NaHCO_3$), ammonium sulfate ($(NH_4)_2SO_4$), urea ($CO(NH_2)_2$), sulfamic acid ($NH_2SO_3H$), ammonium chloride ($NH_4Cl$), and mixtures thereof.

For example, ammonium chloride ($NH_4Cl$) and ammonium sulfate ($(NH_4)_2SO_4$) release ammonia ($NH_3$) during their thermal decomposition. Ammonium chloride and ammonium sulfate decompose at corresponding temperature ranges. In particular, ammonium chloride decomposes at in the temperature range of about 520° C. to 530° C.:

$$NH_4Cl \rightarrow NH_3 + HCl \qquad \text{(Eq. 1)}$$

while ammonium sulfate decomposes in the temperature range of about 170° C. to 500° C.:

$$\left.\begin{aligned} (NH_4)_2SO_4 &\rightarrow NH_3 + NH_4HSO_4 \\ NH_4HSO_4 &\rightarrow NH_3 + SO_2 + H_2O + \tfrac{1}{2}O_2 \end{aligned}\right\} \qquad \text{(Eq. 2)}$$

Having a very low flammability, the volatile ammonia released during the decomposition process contributes to the cooling of the combustion zone.

Another example is sodium bicarbonate ($NaHCO_3$), that undergoes thermal decomposition via endothermic chemical reaction at the temperature range of 60° C. to 200° C., to release water and carbon dioxide ($CO_2$):

$$2NaHCO_3 \rightarrow Na_2CO_3 + H_2O + CO_2 \qquad \text{(Eq. 3)}$$

Sulfamic acid ($NH_2SO_3H$) undergoes thermal decomposition at a temperature range of 260° C. to 400° C.:

$$\left.\begin{aligned} 2NH_2SO_3H &\rightarrow SO_2 + SO_3 + N_2 + H_2O \text{ (at about 260° C.)} \\ NH_2SO_3H &\rightarrow NH_3 + SO_3 \text{ (at about 400° C.)} \end{aligned}\right\} \qquad \text{(Eq. 4)}$$

Urea ($CO(NH_2)_2$) undergoes thermal decomposition at a temperature range of 130° C. to 275° C. Urea decomposes and releases ammonia ($NH_3$). Further, when the reaction product (isocyanic acid) reacts with water, additional ammonia is released:

$$\left.\begin{aligned} (NH_2)_2CO &\rightarrow NH_3 + HNCO \\ HNCO &\rightarrow NH_3 + CO_2 + H_2O \end{aligned}\right\} \qquad \text{(Eq. 5)}$$

Thus, proper combination of cooling components that cover a broad range of thermal decomposition reactions result in an effective fire extinguishing functionality over various burning temperature.

The fire-isolation component refers to one or more components that function to isolate the burning material or fuel in the combustion zone, typically by chemically reacting when exposed to suitable reaction temperatures to form a fire-resistant, oxygen barrier layer over the burning material. Thus, the fire-isolation component forms a barrier between the fuel and oxygen, as well as prevents the fire from re-igniting. As noted, the fire-isolation component includes at least a mixture of at least one sulfate salt, for example an alkali or alkali earth sulfate salts, and at least one alum. Within the context of the present disclosure alum means to denote a double sulfate salt of aluminum, with the general formula $XAl(SO_4)_2$, where X is a monovalent cation such as potassium or ammonium. The alum can be in non-hydrated or in hydrated form, e.g. $XAl(SO_4)_2 \cdot mH_2O$, where m is an integer (m≥1). An example of a hydrated alum is $XAl(SO_4)_2 \cdot 12H_2O$.

Without wishing to be bound by theory, it was found that while alums do not typically have fire extinguishing functionalities, adding alums to the compositions of this disclosure resulted in a heat-driven chemical reaction with sulfate salts, and forming a stable fire-resistant, oxygen barrier forming onto the burning material. Hence, compositions of this disclosure, as will be shown further herein, demonstrate superior fire extinguishing performance, with a synergistic effect obtained at least between alums and sulfate salts present in the composition.

By some embodiments, the alum can be selected from at least one of alum potassium sulfate ($KAl(SO_4)_2 \cdot 12H_2O$), alum sodium sulfate ($NaAl(SO_4)_2 \cdot 12H_2O$), and alum ammonium sulfate ($NH_4Al(SO_4)_2 \cdot 12H_2O$), while the sulfate salt can be selected from at least one of sodium sulfate ($Na_2SO_4$), potassium sulfate ($K_2SO_4$), and ammonium sulfate $(NH_4)_2SO_4$.

By another example, it was found that combinations of sulfate salts, especially alkali sulfates such as sodium sulfate ($Na_2SO_4$) and alums such as potassium sulfate ($AlKSO_4$) chemically react with one another in order to form a fire-resistant layer on the surface of the burning material.

By some embodiments, the weight ratio between said at least one sulfate salt and at least one alum is in the range of between about 2:1 to about 8:1. According to other embodiments, the weight ratio between the at least one sulfate salt and at least one alum can be 2:1, 3:1, 4:1, 5:1, 6:1, 7:1, or even 8:1. According to yet other embodiments, the weight ratio between said at least one sulfate salt and at least one alum is in the range of between about 2:1 to about 6:1.

The fire-isolation component can further comprise one or more of alkali alkyl sulfate salts ($C_nH_{2n+1}OSO_2OMe$; n is an integer (n≥1), Me being an alkali or alkali-earth metal cation), silicon dioxide ($SO_2$), ammonium halides such as ammonium chloride ($NH_4Cl$), sodium alkyl sulfate (such as sodium dodecyl sulfate $CH_3(CH_2))_{11}OSO_2Na$), silicon dioxide ($SiO_2$), and mixtures thereof.

For example, sodium alkyl sulfate is a foaming agent. It operates by forming an insulating foam layer (constituting the fire-resistant layer) on the surface of the burning material. The oxidizer diluting component refers to one or more components that dilutes (i.e. reduce concentration of) oxygen in the gaseous environment at the combustion zone. The oxidizer diluting component is capable of releasing carbon dioxide ($CO_2$) to the combustion zone during its thermal decomposition. Thus, according to some embodiments, the oxidizer diluting component can be selected from one or more compounds that form carbon dioxide as one or their thermal decomposition products.

According to some embodiments, the oxidizer diluting component can be selected from carbonate metal salts, bicarbonate metal salts, urea (or carbamate), sulphates, and mixtures thereof.

By some embodiments, the oxidizer diluting component can be selected from sodium bicarbonate ($NaHCO_3$), potassium bicarbonate ($KHCO_3$), sodium carbonate ($Na_2CO_3$), potassium carbonate ($K_2CO_3$), urea ($(NH_2)_2CO$), and mixture thereof.

As noted, dilution can be achieved by adding carbon dioxide ($CO_2$) into the combustion zone, which is generated by corresponding chemical reactions, for example by carbon dioxide release in the thermal decomposition process of urea. Another example is thermal decomposition of sodium bicarbonate:

$$2NaHCO_3 \rightarrow Na_2CO_3 + H_2O + CO_2 \quad \text{(Eq. 6)}$$

As can be seen, when the sodium bicarbonate and the urea undergo thermal decomposition, they release carbon dioxide ($CO_2$). As a result of release of the carbon dioxide, the air within the combustion zone does not oxidize, thus suffocating the fire in the combustion zone.

As mentioned above, sodium bicarbonate undergoes thermal decomposition via endothermic chemical reaction in the temperature range of 60° C. to 200° C., and urea undergoes thermal decomposition in the temperature range of 130° C. to 275° C.

One or more flame retarding components are also included in the compositions of this disclosure. The flame retarding component suppresses (typically by reducing the rate), or even stop, chemical reactions associated with burning processes which occur in the combustion zone.

By some embodiments, the flame retardant can be selected from sodium bicarbonate ($NaHCO_3$).

By some embodiments, the firefighting composition enables fire extinguishing across a burning temperature range of between about 60° C. to about 1000° C. This enables the compositions of this disclosure to be effective in extinguishing fire of various classes, as described hereinabove.

According to some embodiments, the firefighting composition comprises one or more fire extinguishing components operable within a temperature range of between about 60° C. to about 200° C. Such fire extinguishing components can provide cooling and dilution of air surrounding the combustion zone for preventing oxygen to enter the combustion zone, for example sodium bicarbonate.

According to other embodiments, the firefighting composition comprises one or more fire extinguishing components operable within a temperature range of between about 170° C. to about 500° C. Such fire extinguishing components can provide cooling of the combustion zone, for example ammonium sulfate and urea.

According to yet other embodiments, the fire-fighting composition comprises at least one fire extinguishing component operable at in the temperature range of 260° C. to 400° C. Such fire extinguishing components provide cooling of the combustion zone, for example sulfamic acid.

According to further embodiments, the firefighting composition comprises at least one fire extinguishing component operable within the temperature range of between about 520° C. to about 530° C. Such fire extinguishing components provide cooling of the combustion zone and isolation of the combustion zone by generating a fire-resistant layer on a surface of the combustion zone, for example ammonium chloride.

According to yet further embodiments, the firefighting composition comprises at least one fire extinguishing component operable within in the temperature range of between about 880° C. to about 890° C. Such fire extinguishing components provide isolation of the combustion zone by generating a fire-resistant layer on a surface of the combustion zone, for example sodium sulfate.

According to some further embodiments, the firefighting composition comprises at least one fire extinguishing component operable within the temperature range of between about 210° C. to about 220° C. Such fire extinguishing components provide isolation of the combustion zone by generating a fire-resistant layer on a surface of the combustion zone, for example sodium alkyl sulfate.

The term operable as used herein is meant to denote activation of the component, either thermally (i.e. thermal decomposition) or chemically (i.e. reaction with another component or substance that occurs at the respective temperature).

The firefighting composition of this disclosure may be in any suitable form for dispersing or applying over a combustion zone. For example, the composition may be in the form of a powder, a solution, a suspension, a gel, a foam, or any other suitable form.

According to some embodiments, the firefighting composition comprises one or more pigments. The pigments can be utilized to distinguish between different compositions, as well as assist in identifying areas which have been already treated by the composition, for example areas onto which the firefighting composition has been deployed for fire prevention or fire barrier purposes.

By another aspect, there is provided a firefighting composition for preventing, retarding, and/or extinguishing a fire in a combustion zone, the composition being in dry powder form and comprises at least one cooling component, at least one fire-isolation component comprising at least one sulfate salt and at least one alum, at least one oxidizer diluting component, and at least one flame retarding component.

The powder particles may be porous or non-porous, and have any geometrical shape (spherical, elliptical, prismoid, irregular, etc.). According to some embodiments, the average particle size of powder can be in the range of between about 50 nanometers (nm) and about 150 micrometers (μm).

According to some embodiments, the powder particles have a mono-modal size distribution. By other embodiments, the powder particles have mono-modal size distribution with a size distribution of about ±20% from the average particle size. Without wishing to be bound by theory, by providing the powder with a uniform particle size, the powder particles are hydrolyzed at the same rate, thereby enabling the powder to be solubilized quickly when incorporated into water, resulting in the capability to quickly prepare the firefighting composition in liquid form on site. Further, a uniform particle size, e.g. uniform sub-micron size, enables the particles of the powder to easily and effectively penetrate the burning site when used in dry form. In other words, the powder can easily penetrate between burning particulate matter, for example when used to extinguish fire in a burning field or burning pile of material.

The term average particle size refers to the arithmetic mean of the diameters of the particles, wherein the diameters range ±25% of the mean, assuming the particles are substantially spherical (round-ball geometry). In case the particles are non-spherical, the term means to denote average of size of an equivalent sphere having the particles' longest dimension as their diameters. It should be noted that the averaged particle size may be measured by any method known to a person skilled in the art.

The dry powder can, by some embodiments, be applied on to the combustion zone by any suitable dispersion means. Alternatively, the dry powder can be mixed with or dissolved into a non-flammable carrier liquid.

As noted above, the firefighting composition may also be in non-solid form, e.g. a solution or suspension. Thus, by another aspect, the disclosure provides a firefighting composition for preventing, retarding, and/or extinguishing a fire in a combustion zone, the composition being in liquid form and comprising at least one cooling material, at least one fire-isolation material comprising at least one sulfate salt and at least one alum, at least one oxidizer diluting material, at least one flame retarding material, and at least one non-flammable liquid.

The non flammable liquid is a liquid that does not ignite or does not produce ignitable decomposition products during its thermal decomposition at the temperatures of burning at the combustion zone. In some embodiments, the non-flammable liquid is water.

The liquid composition, by some embodiments, may be in the form of a solution (namely, having its components dissolved in the non-flammable liquid) or in the form of a suspension (i.e. with at least some of the components of the composition being at least partially non-dissolved in the non-flammable liquid).

According to some embodiments, the amount of non-flammable liquid out of the liquid firefighting composition can range between about 50 wt % and about 95 wt %.

This disclosure also provides a process for manufacturing the firefighting composition disclosed herein. Thus, by another one of its aspects, the disclosure provides a process for manufacturing of a firefighting powder composition, the process comprises blending at least one cooling component, at least one fire-isolation component composing a mixture of at least one sulfate salt and at least one alum, at least one oxidizer diluting component, and at least one flame retarding component to obtain said firefighting composition.

According to some embodiments, the process comprises grinding the components to a predetermined average particle size. In some embodiments, grinding is carried out during or after blending. However, according to preferable embodiments, at least some of the components, at times each of the components, undergoes grinding to said predetermined average particle size before said blending.

By some embodiments, said predetermined average particle size is in the range of between about 50 nm and about 150 μm.

Grinding can be carried out by any suitable means known per-se, for example ball milling, hammer milling, attrition, fluid energy milling, etc. Preferably, grinding is carried out by ball milling.

The process can further comprise, by some embodiments, drying said components before said blending and/or before said grinding to obtain dry components. By some embodiments, each of the components of the composition is dried separately. Alternatively, drying of some of the components can be carried out concomitantly. The water content of the components after drying is typically no more than about 5 wt %.

By some embodiments, drying of the components can be carried out for a period of time of between about 30 minutes (min) and about 60 min per one ton of material. By other embodiments, drying of the components can be carried out in a temperature range of between about 40° C. and about 60° C.

Hence, by some embodiments, a process for manufacturing of a powder composition according to this disclosure comprises:

(a) drying each of said components under conditions permitting removal of volatile liquids therefrom, for obtaining dried components having water content of no more than about 5 wt %;

(b) grinding each of the dried components for obtaining ground components having each an average particle size of between about 50 nm and 150 μm; and (c) mixing the ground components under conditions permitting obtaining said firefighting powder composition.

By another aspect, there is provided a process for manufacturing a liquid firefighting composition according to this disclosure, the process comprises mixing at least one cooling component, at least one fire-isolation component comprising at least one sulfate salt and at least one alum, at least one oxidizer diluting component, and at least one flame retarding component into a non-flammable liquid, thereby obtaining said liquid firefighting composition.

By some embodiment, mixing is carried out a temperature of ranging between about 0 ° C. and 60 ° C., preferably ranging between about 20 ° C. and about 40 ° C.

By some embodiments, the at least one cooling component, at least one fire-isolation component, at least one oxidizer diluting component, and at least one flame retarding component are provided in the form of a firefighting powder composition as described hereinabove. By other embodiments, the at least one cooling component, at least one fire-isolation component, at least one oxidizer diluting component, and at least one flame retarding component are mixed into the non-flammable liquid according to a predetermined sequence of manufacturing. Each of the components may be dried and/or ground as described herein before mixing into the non-flammable liquid.

By some other embodiments, the process includes preparing a stock solution of said components in said non-flammable liquid, and diluting the stock solution with an additional amount of said non-flammable liquid for obtaining said liquid firefighting composition prior to use. For example, small volumes of concentrated stock solution can be manufactured for ease of delivery to a combustion zone, and diluted on site before application to the desired concentration by adding further non-flammable liquid.

By another aspect, there is provided a firefighting composition in powder form, comprising sulfamic acid, ammonium sulfate, urea, ammonium chloride, sodium bicarbonate, sodium sulfate, alum potassium sulfate, and sodium alkyl sulfate, optionally comprising silicon dioxide.

By a further aspect, there is provided a firefighting composition in powder form, comprising sulfamic acid in amount of between about 0.4 wt % and about 30 wt %, ammonium sulfate in an amount of between about 0.5 wt % and about 50 wt %, urea in an amount of between about 0.3 wt % and about 20 wt %, ammonium chloride in an amount of between about 0.05 wt % and about 10 wt %, sodium bicarbonate in an amount of between about 0.05 wt % and about 10 wt %, sodium sulfate in an amount of between about 0.05 wt % and about 10 wt %, alum potassium sulfate in an amount of between about 0.01 wt % and about 2.5 wt %, and sodium alkyl sulfate in an amount of between about 0.01 wt % and 5 wt %, optionally comprising silicon dioxide in an amount of between about 0.01 wt % and about 5 wt %.

According to another aspect, there is provided a firefighting composition in powder form, consisting of sulfamic acid, ammonium sulfate, urea, ammonium chloride, sodium bicarbonate, sodium sulfate, alum potassium sulfate, and sodium alkyl sulfate, optionally comprising at least one of silicon dioxide and a pigment.

By another aspect, there is provided a firefighting composition in powder form, consisting of sulfamic acid in amount of between about 0.4 wt % and about 30 wt %, ammonium sulfate in an amount of between about 0.5 wt % and about 50 wt %, urea in an amount of between about 0.3 wt % and about 20 wt %, ammonium chloride in an amount of between about 0.05 wt % and about 10 wt %, sodium bicarbonate in an amount of between about 0.05 wt % and about 10 wt %, sodium sulfate in an amount of between about 0.05 wt % and about 10 wt %, alum potassium sulfate in an amount of between about 0.01 wt % and about 2.5 wt %, and sodium alkyl sulfate in an amount of between about 0.01 wt % and 5 wt %, optionally also including silicon dioxide in an amount of between about 0.01 wt % and about 5 wt %.

By yet another aspect, there is provided a firefighting composition in liquid form, the composition comprising a non-flammable liquid, sulfamic acid, ammonium sulfate, urea, ammonium chloride, sodium bicarbonate, sodium sulfate, alum potassium sulfate, and sodium alkyl sulfate, and optionally comprising silicon dioxide.

By a further aspect, there is provided a firefighting composition in liquid form, the composition comprising a non-flammable liquid in an amount of between about 50 wt % and 95 wt %, and a mixture of components in an amount of between about 5 wt % and 5 wt %, said mixture of components comprising (in weight % out of the total amount of the mixture of materials): sulfamic acid in amount of between about 0.4 wt % and about 30 wt %, ammonium sulfate in an amount of between about 0.5 wt % and about 50 wt %, urea in an amount of between about 0.3 wt % and about 20 wt %, ammonium chloride in an amount of between about 0.05 wt % and about 10 wt %, sodium bicarbonate in an amount of between about 0.05 wt % and about 10 wt %, sodium sulfate in an amount of between about 0.05 wt % and about 10 wt %, alum potassium sulfate in an amount of between about 0.01 wt % and about 2.5 wt %, and sodium alkyl sulfate in an amount of between about 0.01 wt % and 5 wt %, and optionally comprising silicon dioxide in an amount of between about 0.01 wt % and about 5 wt %.

It should be noted that the firefighting solution of the present invention can be used for pre-treating an area on which a fire can occur, and the objects located on this area. As a result of such pre-treatment, a fire resisting layer formed from the salts of the composition can be formed that can protect the treated area and objects therein from ignition.

As used herein, the term about is meant to encompass deviation of ±10% from the specifically mentioned value of a parameter, such as temperature, pressure, concentration, etc.

Whenever a numerical range is indicated herein, it is meant to include any cited numeral (fractional or integral) within the indicated range. The phrases ranging/ranges between a first indicate number and a second indicate number and "ranging/ranges from" a first indicate number "to" a second indicate number are used herein interchangeably and are meant to include the first and second indicated numbers and all the fractional and integral numerals therebetween.

Generally it is noted that the term ". . . at least one . . . " as applied to any component of a composition disclosed herein should be read to encompass one, two, three, four, five, or even more different occurrences of said component in a composition of this disclosure.

Processes disclosed herein involve numerous process steps which may or may not be associated with other common physical-chemical processes so as to achieve the desired composition. Unless otherwise indicated, such process steps, if present, may be set in different sequences without affecting the workability of the process and its efficacy in achieving the desired end result. As a person skilled in the art would appreciate, a sequence of steps may be employed and changed depending on various economical aspects, material availability, environmental considerations, etc.

It should be understood that the reactions/decompositions exemplified herein and describing the effects occurring in the combustion zone, and thus affecting the fire progression (in time and space), may be either single- or multi-step transitions, because by-products of one chemical reaction might interact with by-products of one or more other chemical reactions, thus causing one or more intermediate chemical reactions.

DETAILED DESCRIPTION OF EMBODIMENTS

As noted, the fire extinguishing composition includes a plurality of fire extinguishing components. Each extinguishing component operates in a corresponding temperature range, and provides at least one fire extinguishing effect, such as cooling, dilution, isolation and retardation, thus providing a fire extinguishing functionality over a broad range of temperatures and fire conditions. Further, at least some components of the composition were found to provide a synergistic fire extinguishing effect when combined, resulting in significantly improved extinguishing performance enabling utilization of significantly less amounts of composition to obtain complete extinguishing of fire, as well as reducing the time required to obtain complete fire extinguishing.

Table 1 shows the activity temperature range and the extinguishing effect(s) of an exemplary firefighting composition according to the present disclosure.

TABLE 1

Exemplary firefighting composition

| Component | Activity temperature range (° C.) | Extinguishing effect(s) |
|---|---|---|
| Sodium bicarbonate $NaHCO_3$ | 60° C. to 200° C. | Cooling, dilution and flame retarding |
| Ammonium sulfate $(NH_4)_2SO_4$ | 170° C. to 500° C. | Cooling |
| Urea $CO(NH_2)_2$ | 130° C. to 275° C. | Cooling and dilution |
| Sulfamic acid $NH_2SO_3H$ | 260° C. to 400° C. | Cooling |
| Ammonium chloride $NH_4Cl$ | 520° C. to 530° C. | Cooling and isolation |
| Sodium sulfate $Na_2SO_4$ | 880° C. to 890° C. | Foaming agent, isolation |
| Alum potassium $KAl(SO_4)_2{\bullet}12H_2O$ | >900° C. | Isolation |
| Silicon dioxide $SiO_2$ | 800° C. to 1000° C. | Isolation |
| Sodium alkyl sulfate $CH_3(CH_2)_{11}OSO_2Na$ | 210° C. to 220° C. | Isolation |

As can be seen from Table 1, each component in the firefighting composition has a corresponding activity temperature range and one or more fire extinguishing effect(s). Thus, the fire-fighting composition operates in the entire temperature range of 60° C. to 1000° C. This temperature range is rather broad and is suitable for extinguishing fires of various classes.

EXAMPLE 1: PREPARATION OF A FIREFIGHTING COMPOSITION IN POWDER FORM

Preparation of Dry Powders

Ammonium sulfate, sulfamic acid, urea, ammonium chloride, sodium bicarbonate, sodium sulfate, alum potassium, and sodium alkyl sulfate are provided, typically in the form of granules having a size of between about 0.5 mm and about 2 mm.

The granules were dried for about 0.5-1 hours at 40-60° C., until reaching a moisture content of below 5 wt %.

The dried granules of each material were separately ground in a ball mill to obtain powders having an average particle size of 50 nm to 150 μm with a mono-modal size distribution (a size distribution of about ±20% from the average particle size).

The powders were then blended according to the following composition, thus obtaining the firefighting composition:

- ammonium sulfate at a concentration from 0.5 wt % to 50 wt %,
- sulfamic acid at a concentration from 0.4 wt % to 30 wt %,
- urea at a concentration from 0.3 wt % to 20 wt %,
- ammonium chloride at a concentration from 0.05 wt % to 10 wt %,
- sodium bicarbonate at a concentration from 0.05 wt % to 10 wt %,
- sodium sulfate at a concentration from 0.05 wt % to 10 wt %,
- alum potassium at a concentration from 0.01 wt % to 2.5 wt %,
- silicon dioxide at a concentration from 0.01 wt % to 5 wt %, and
- and sodium alkyl sulfate at a concentration from 0.01 wt % to 5 wt %.

EXAMPLE 2: PREPARATION OF A FIREFIGHTING LIQUID COMPOSITION

Preparation of Ingredients

Ammonium sulfate, sulfamic acid, urea, ammonium chloride, sodium bicarbonate, sodium sulfate, alum potassium, and sodium alkyl sulfate are provided, typically in the form of granules having a size of between about 0.5 mm and about 2 mm.

The granules were dried for about 0.5-1 hours at 40-60° C., until reaching a moisture content of below 5 wt %.

The dried granules of each material can optionally be ground in a ball mill to obtain powders having an average particle size of 50 nm to 150 μm with a mono-modal size distribution (a size distribution of about ±20% from the average particle size).

Preparation of Liquid Composition

Water was fed into a suitable reactor. The other components were added according to an exemplary composition set out in Table 2.

TABLE 2

| Exemplary firefighting compositions (in wt %) | |
|---|---|
| Component | Exemplary composition |
| Sodium bicarbonate | 5-10 wt % |
| Ammonium sulfate | 20-50 wt % |
| Urea | 7.5-20 wt % |
| Sulfamic acid | 7-30 wt % |
| Ammonium chloride | 5-10 wt % |
| Sodium sulfate | 2-10 wt % |
| Alum potassium | 0.5-2.5 wt % |
| Sodium alkyl sulfate | 1-5 wt % |

Sulfamic acid was added into the reactor and mixed for dissolving, e.g. for 5-7 minutes. Then, ammonium sulfate and urea were added into the reactor and mixed for about 8-12 minutes until dissolving. Ammonium chloride was added into the reactor and let to dissolve. Sodium bicarbonate was gradually added for obtaining a pH in the range of 5.0-5.5, and mixed to dissolving. Sodium sulfate and alum potassium were then added, mixed and dissolved until reaching a pH in the range of 8 to 9, followed by addition of sodium alkyl sulfate.

EXAMPLE 3: COMPARATIVE FIRE EXTINGUISHING TESTS

Liquid compositions according to the formulation described in Example 2 were prepared. For comparative purposes, liquid compositions were prepared without alum potassium and/or without sodium sulfate.

Extinguishing of a standard A-0.5 hearth was tested under standard weather conditions: air temperature 32° C., western wind 6-8 m/s, air humidity 25%, daylight hours 12 AM. The test results are detailed in Table 3.

TABLE 3

Comparative fire extinguishing test results

| Test | Composition | Time to complete fire extinguishing | Volume of solution used |
|---|---|---|---|
| P1 | Example 2, without alum potassium | 31 seconds | 2.1 liters |
| P2 | Example 2, without sodium sulfate | 26 seconds | 1.9 liters |
| P3 | Example 2 | 10 seconds | 0.5 liters |
| P4 | Example 2, without alum potassium and sodium sulfate | 44 seconds | 3.6 liters |
| P5 | Water | 70 seconds | 9.0 liters |

As can clearly be observed, compositions that included only one of alum potassium and sodium sulfate have shown similar fire extinguishing results in both time and volume required to obtain extinguishing of the fire (P1,P2).

However, when combined (P3), surprising reduction of extinguishing time was obtained — extinguishing utilization composition P3 was obtained already at 30% of the time required for examples P1 and P2. Further, the volume of solution required in order to obtain complete extinguishing with composition P3 was only 25% of the volume required when using formulations P1 and P2. Therefore, as can clearly be observed, the combination of alum potassium and sodium sulfate proved to have an unexpected synergistic effect on the fire extinguishing performance of the composition.

The invention claimed is:

1. A fire firefighting composition for preventing, retarding, and/or extinguishing a fire in a combustion zone, the composition comprising sulfamic acid in amount of between about 0.4 wt % and about 30 wt %, ammonium sulfate in an amount of between about 0.5 wt % and about 50 wt %, urea in an amount of between about 0.3 wt % and about 20 wt %, ammonium chloride in an amount of between about 0.05 wt % and about 10 wt %, sodium bicarbonate in an amount of between about 0.05 wt % and about 10 wt %, sodium sulfate in an amount of between about 0.05 wt % and about 10 wt %, alum potassium sulfate in an amount of between about 0.01 wt % and about 2.5 wt %, and sodium alkyl sulfate in an amount of between about 0.01 wt % and 5 wt %.

2. The composition of claim 1, wherein the composition is formulated for extinguishing fire at a burning temperature range of between about 60° C. to about 1000° C.

3. The composition of claim 1, wherein the composition comprises one or more pigments.

4. The composition of claim 1, further comprising silicon dioxide in an amount of between about 0.01 wt % and about 5 wt %.

5. The composition of claim 1, being in the form of a powder.

6. The composition of claim 5, wherein the powder comprises no more than about 5 wt % water.

7. The composition of claim 5, wherein the powder has an average particle size in the range of between about 50 nm and about 150 μm.

8. The composition of claim 7, wherein the powder particles have a mono- modal size distribution.

9. The composition of claim 1, further comprising a non-flammable liquid and the composition being in a liquid form.

10. The composition of claim 9, wherein the non-flammable liquid is water.

11. A firefighting composition for preventing, retarding, and/or extinguishing a fire in a combustion zone, the composition being in dry powder form and comprises sulfamic acid in amount of between about 0.4 wt % and about 30 wt %, ammonium sulfate in an amount of between about 0.5 wt % and about 50 wt %, urea in an amount of between about 0.3 wt % and about 20 wt %, ammonium chloride in an amount of between about 0.05 wt % and about 10 wt %, sodium bicarbonate in an amount of between about 0.05 wt % and about 10 wt %, sodium sulfate in an amount of between about 0.05 wt % and about 10 wt %, alum potassium sulfate in an amount of between about 0.01 wt % and about 2.5 wt %, and sodium alkyl sulfate in an amount of between about 0.01 wt % and 5 wt %.

12. A firefighting composition for preventing, retarding, and/or extinguishing a fire in a combustion zone, the composition being in liquid form and comprising sulfamic acid in amount of between about 0.4 wt % and about 30 wt %, ammonium sulfate in an amount of between about 0.5 wt % and about 50 wt %, urea in an amount of between about 0.3 wt % and about 20 wt %, ammonium chloride in an amount of between about 0.05 wt % and about 10 wt %, sodium bicarbonate in an amount of between about 0.05 wt % and about 10 wt %. sodium sulfate in an amount of between about 0.05 wt % and about 10 wt %, alum potassium sulfate in an amount of between about 0.01 wt % and about 2.5 wt %, and sodium alkyl sulfate in an amount of between about 0.01 wt % and 5 wt %.

13. The composition of claim 11, comprising sulfamic acid in amount of between about 0.4 wt % and about 30 wt %, ammonium sulfate in an amount of between about 0.5 wt % and about 50 wt %, urea in an amount of between about 0.3 wt % and about 20 wt %, ammonium chloride in an amount of between about 0.05 wt % and about 10 wt %, sodium bicarbonate in an amount of between about 0.05 wt % and about 10 wt %, sodium sulfate in an amount of between about 0.05 wt % and about 10 wt %, alum potassium sulfate in an amount of between about 0.01 wt % and about 2.5 wt %, and sodium alkyl sulfate in an amount of between about 0.01 wt % and 5 wt %, further comprising silicon dioxide in an amount of between about 0.01 wt % and about 5 wt %.

14. The composition of claim 12, further comprising silicon dioxide in an amount of between about 0.01 wt % and about 5 wt %.

* * * * *